(12) United States Patent
Baynard et al.

(10) Patent No.: US 6,487,813 B2
(45) Date of Patent: Dec. 3, 2002

(54) DUAL POSITION FISHING ROD HOLDER

(76) Inventors: D. Calvin Baynard, Rte. 7, Box 1444, Manning, SC (US) 29102; David A. Baynard, Rte. 1, Box 1407H, Alcolu, SC (US) 29001

(*) Notice: Subject to any disclaimer, the term of this patent is extended or adjusted under 35 U.S.C. 154(b) by 0 days.

(21) Appl. No.: 09/826,689

(22) Filed: Apr. 5, 2001

(65) Prior Publication Data

US 2001/0011435 A1 Aug. 9, 2001

Related U.S. Application Data

(63) Continuation-in-part of application No. 09/500,773, filed on Feb. 8, 2000.

(51) Int. Cl.[7] ............................................. A01K 97/10
(52) U.S. Cl. ........................................ 43/21.2; 248/538
(58) Field of Search .................. 43/21.2; 248/518–520, 248/538

(56) References Cited

U.S. PATENT DOCUMENTS

| | | | | |
|---|---|---|---|---|
| 2,059,921 A | * | 11/1936 | Weiss ......................... | D22/147 |
| 2,137,645 A | * | 11/1938 | Doench ....................... | 43/21.2 |
| 2,176,352 A | * | 10/1939 | McHuron ................... | 248/518 |
| 2,220,234 A | * | 11/1940 | Hadaway .................... | 248/538 |
| 2,602,618 A | * | 7/1952 | Cohen ........................ | 43/21.2 |
| 2,773,603 A | | 12/1956 | Gronek ....................... | 248/538 |
| 2,888,220 A | | 5/1959 | Rose ........................... | 248/538 |
| 3,934,801 A | | 1/1976 | Johnson ...................... | 248/515 |
| 4,366,640 A | * | 1/1983 | Clapp ......................... | 43/21.2 |
| 4,531,643 A | * | 7/1985 | Bradley ...................... | 248/538 |
| 4,640,038 A | * | 2/1987 | Jershin ....................... | 43/21.2 |
| 5,088,224 A | * | 2/1992 | Gutierrez .................... | 43/21.2 |
| D345,409 S | * | 3/1994 | Baynard .................... | D22/147 |
| 5,295,321 A | * | 3/1994 | Matura ....................... | 43/21.2 |
| 5,937,567 A | * | 8/1999 | Elkins ........................ | 43/21.2 |
| 5,975,479 A | | 11/1999 | Suter .......................... | 248/534 |
| 5,987,804 A | * | 11/1999 | Shearer et al. .............. | 43/21.2 |
| 5,996,958 A | * | 12/1999 | Baynard et al. ............. | 43/21.2 |
| 6,112,449 A | | 9/2000 | Blackwell ................... | 43/21.2 |
| 6,213,441 B1 | * | 4/2001 | Baynard et al. ............. | 43/21.2 |

FOREIGN PATENT DOCUMENTS

| | | | |
|---|---|---|---|
| EP | 1060665 B1 | * | 12/2000 |
| FR | 2590962 | | 5/1987 |
| FR | 2590962 B1 | * | 6/1987 |
| JP | 11-46655 | | 2/1999 |
| JP | 11-46655 B1 | * | 2/1999 |

\* cited by examiner

*Primary Examiner*—Darren W. Ark
(74) *Attorney, Agent, or Firm*—McNair Law Firm, P.A.

(57) ABSTRACT

A fishing rod holder is disclosed for supporting a fishing rod in a plurality of fishing positions wherein the rod holder comprises a front fork support having a pair of arms between which the rod is held and a plurality of rod retention elements spaced from the front support fork which position and retain the fishing rod in different elevations and fishing positions.

14 Claims, 5 Drawing Sheets

DUAL POSITION FISHING ROD HOLDER

This is a continuation-in-part of my earlier filed application with Ser. No. 09/500,773 filed on Feb. 8, 2000.

BACKGROUND OF THE INVENTION

This invention relates to fishing, and more particularly to a fishing rod holder which retains a fishing rod in one of two positions to provide for trolling, long casts, and fishing down along the side of a boat.

Previously, various forms of fishing rod holders have been provided. Typically, the fishing rod holder holds the fishing rod in a single position. For example, see U.S. Patent No. Des. 345,409 issued to the applicant. Fishing rod holders have also been provided for holding fishing rods at different angular positions in an adjustable manner, such as shown in U.S. Pat. No. 3,934,801. However, the adjustable type of fishing rod holder normally has a large number of parts which makes such a holder relatively expensive, complex to use, and affects its reliability. In the sport of fishing, it is best to keep an accessory device simple so that it may be easily and reliably used by the fisherman. Another problem with the prior art fishing rod holders is that they are not designed to hold the fishing rod and reel combination in such a position that the rod has stability in the fishing rod holder yet it may be quickly removed from the holder and the reel operated to set a hook in the fish. Thus, the prior art has not provided a suitable fishing rod holder having plural fixed fishing positions in which a fishing rod may be held in a proper position for trolling, long casting, or short casting, or still fishing, and that holds the fishing rod and reel in a stable position from which it may be quickly retrieved for setting the hook in the fish.

Accordingly, an object of the present invention is to provide a fishing rod holder which retains a fishing rod in one of the plural fishing positions.

Another object of the invention is to provide a fishing rod holder having plural retention positions in which the rod is secured in a stable fishing position yet may be released quickly to set a hook.

Another object of the present invention is to provide a fishing rod holder which retains the rod in one of plural fishing positions having a front fork with inclined arms that engage a bait casting reel to prevent the rod from rotating so that the reel does not rotate out of the fishing position.

Another object of the present invention is to provide a fishing rod holder having a plurality of fishing positions which retains a fishing rod and reel in a variety of positions for different fishing techniques wherein the holder is dimensioned and designed for quick rod removal and reliable reel operation.

SUMMARY OF THE INVENTION

The above objectives are accomplished according to the present invention by providing a fishing rod holder for supporting a fishing rod having a reel in a plurality of fishing positions comprising a support for attachment to an associated structure; a front support fork carried by the support having a first pair of arms bent at a first angle, and a second pair of arms bent at a second angle for receiving the fishing rod there between. A first rod retention element is carried by the support in spaced position from the front support fork for positioning and retaining the fishing rod in a generally horizontal fishing position with the fishing line depending from the rod tip. A second rod retention element is carried by the support in spaced position from the front fork for positioning and retaining the fishing rod in an inclined fishing position wherein the tip of the rod is elevated from the horizontal fishing position. The second pair of fork arms are inclined in a rearward direction relative to the first pair of fork arms and include a bridge interconnecting the first pair of fork arms. The bridge has a generally flat upper surface for frictionally engaging the fishing rod. The fork arms are coated with a high friction coefficient surface for gripping the reel carried by the fishing rod to prevent rotation of the rod. The second rod retention element is spaced behind the first rod retention element a greater distance from the front fork and is disposed generally above the first rod retention element.

A first rod release space is defined between the first rod retention element and the second rod retention element for reliable removal of said fishing rod when a fish strike. A second rod release space is defined between the second rod retention element and the front fork for reliable removal of the fishing rod when a fish strikes. The first and second rod retention elements include a flattened handle abutment surface for frictionally engaging the rod over a larger area to resist rod rotation.

The rod holder includes a frame which includes a cross-piece carried by the support; a frame leg extending rearwardly and upwardly from the cross-piece; a second leg extending rearwardly and upwardly from the cross-piece; the second leg being spaced generally laterally from the first leg; and the second rod retention element being carried by at least one frame leg spaced from the cross-piece. The first rod retention element is carried by one of the frame legs generally above and behind the first rod retention element.

The frame preferably comprises a frame loop which includes first and second legs, the loop has a first bend at which the first and second legs turn upwards, a second bend at which the first and second legs turn rearward, and a third bend at which the first and second legs turn inward. Advantageously, the second retention element is disposed near the second bend; and the first rod retention element is formed near the third bend. The first rod retention element is defined by the top piece. The first rod retention element advantageously includes an intermediate brace extending between the first and second legs near the second bend. The first rod retention element includes an intermediate cross-piece extending between the first and second legs near the second bend.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
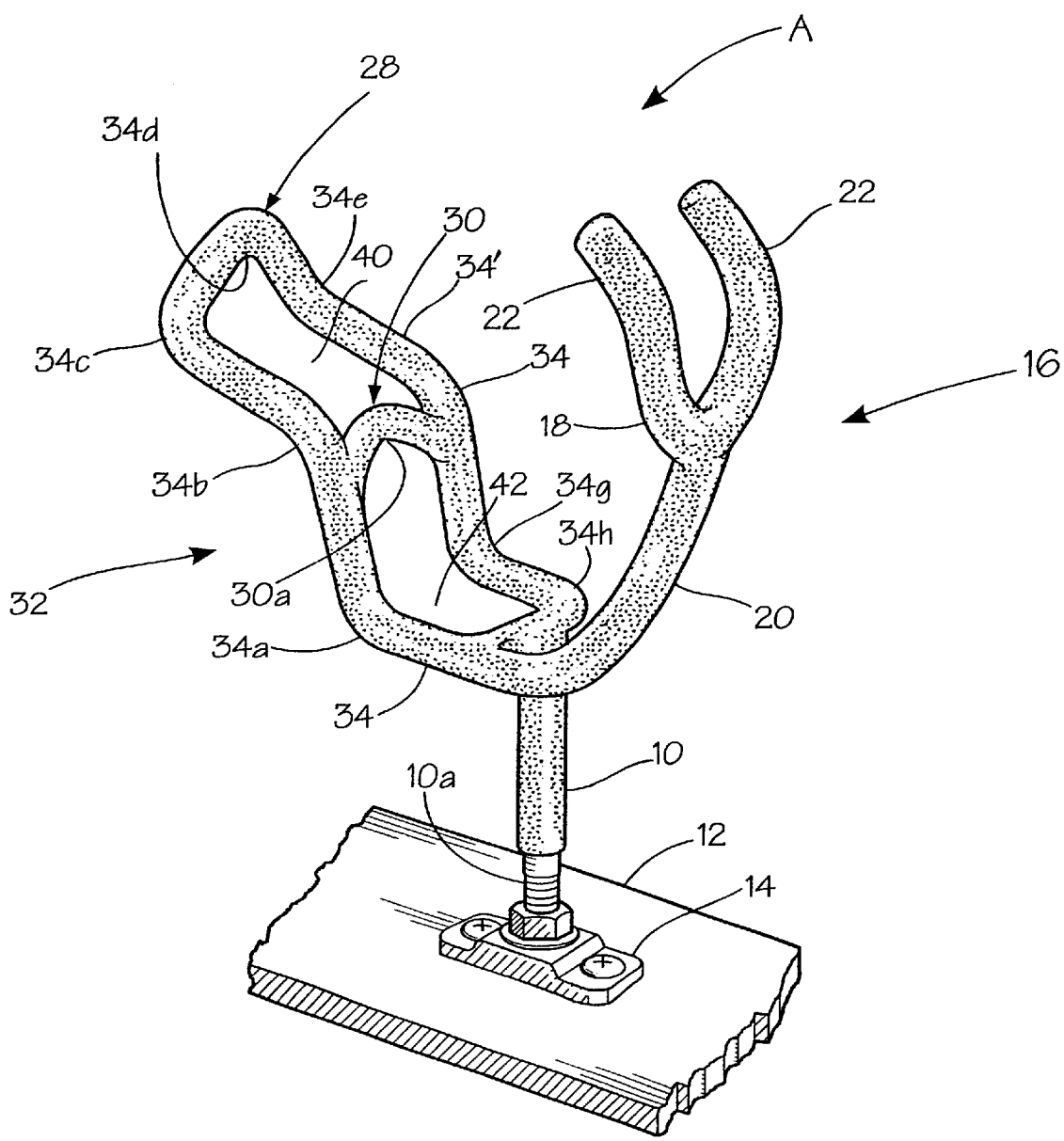
FIG. 1 is a perspective view illustrating a fishing rod holder attached to an associated structure wherein the fishing rod holder has a plurality of retention elements that retain the rod in different fishing positions.
Figure 1A:
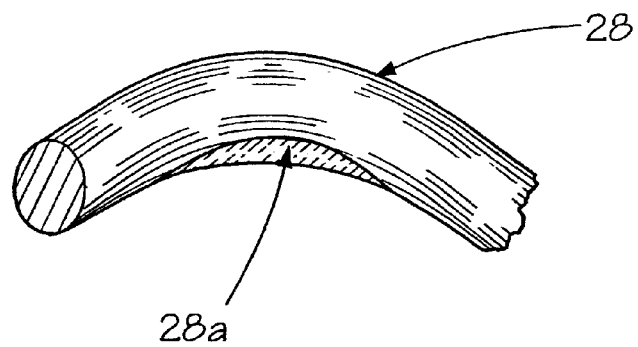
FIGS. 1A–1C are sections showing flattened frictional rod engaging surfaces for effectively and frictionally engaging a rod to present its rotation in the fishing rod holder.
Figure 1B:
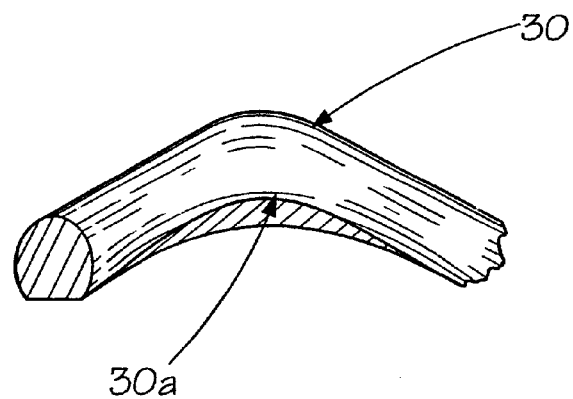
Figure 1C:
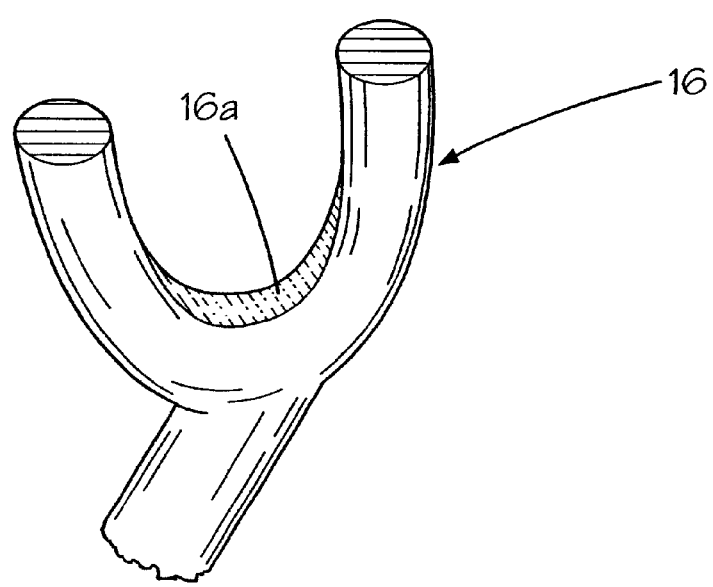
Figure 2:
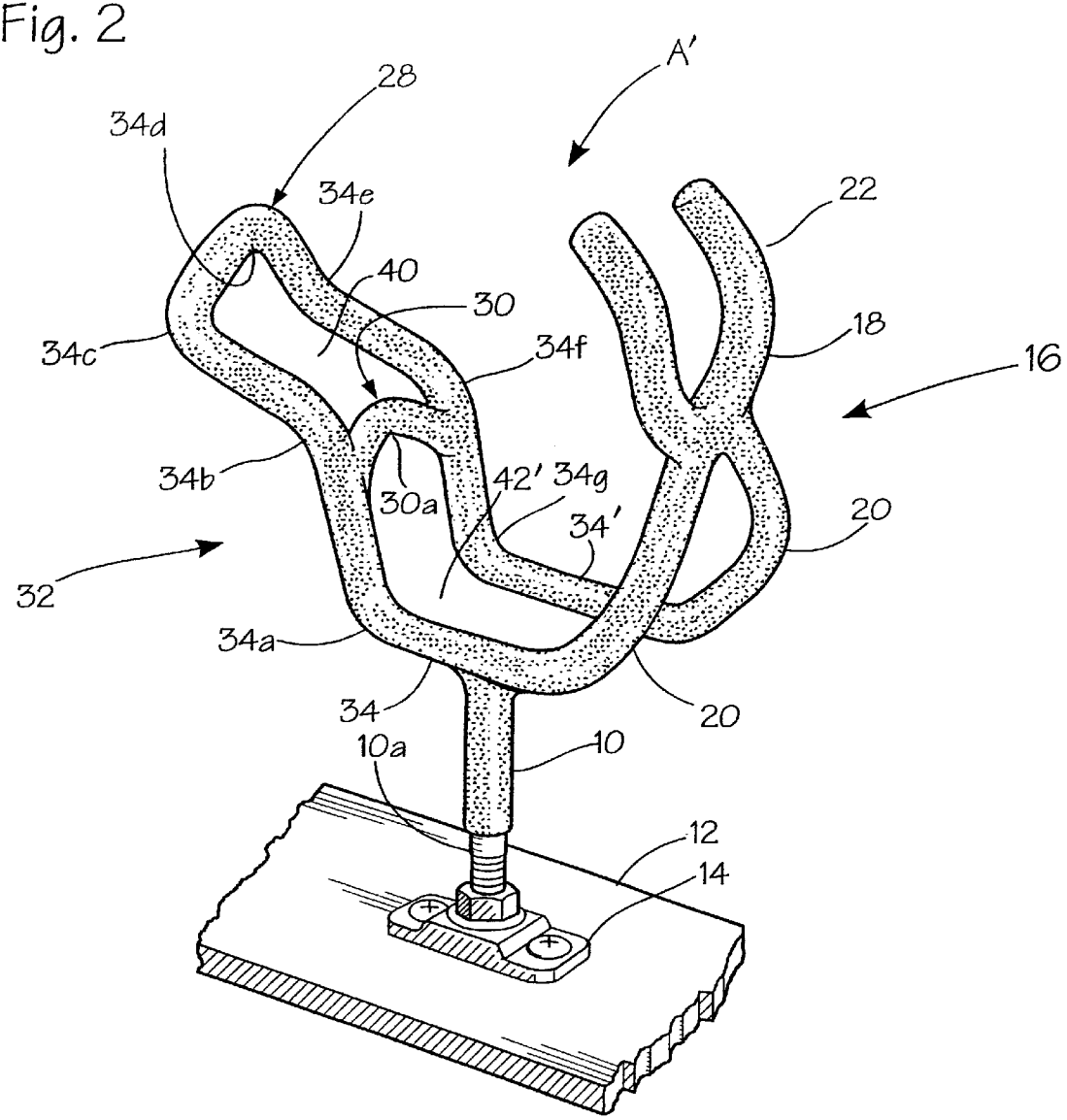
FIG. 2 is a perspective view illustrating an alternative form of a fishing rod holder attached to an associated structure wherein the fishing rod holder has a plurality of retention elements for retaining the fishing rod in different fishing positions.

As can best be seen in FIGS. 1 and 2, fishing rod holders, designated generally as A and A', are disclosed which provides for a plurality of fishing positions. Rod holders or cradles A and A' include an upright support stem 10 mounted to a fixed structure, such as a gunwale 12 of a boat, by means of a mount 14 affixed to the gunwale by means of screws, or other suitable structure. Upright 10 is affixed to the mount by means of a threaded end 10a threaded into the mount.

Figure 2A:
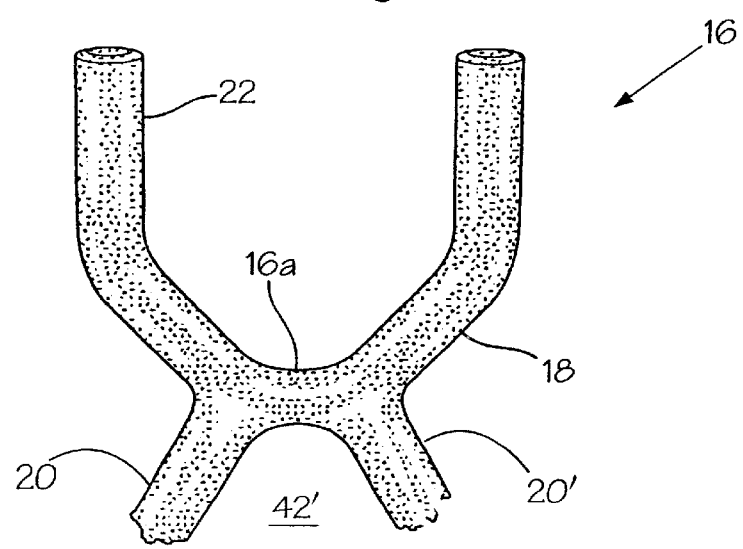
FIG. 2A is a sectional view showing the frictional rod engaging section of the front fork of FIG. 2 and the engagement areas with shafts 20, 20'.

Referring now in more detail to rod holders A and A', there is a generally U-shaped front fork, designated generally as 16, which include a first, lower pair of arms 18 bent at a first angle to a shaft 20 and a second, upper pair of arms 22 bent at a second angle with respect to shaft 20. The upper pair of arms 22 is also bent at an angle relative to the first pair of arms 18 so that arms 22 are inclined to a greater extent rearwardly. In the case of rod holder A' a second shaft 20' connects with lower arms 18 as shown in FIG. 2A and is shaped in the image of shaft 20. Completing the rod cradle for supporting a rod 24 and reel 26 is a plurality of rod retention elements formed at the rear of the rod holder for retaining the rod in one of two fishing positions. There is a first rod retention element, designated generally as 28, and a second rod retention element, designated generally as 30.

In the illustrated embodiments, the front support fork 16 and the rear rod retention elements 28, 30 are made integral with the rod cradle by means of an open frame, designated generally as 32. Frame 32 includes a first leg 34 integral with shaft 20 which extends rearwardly and includes a first bend 34a, a second bend 34b, a third bend 34c. First rod retention element 28 which includes a fourth bend 34d, forming an apex for receiving the butt handle of the fishing rod extends laterally of leg 34 and connects with second leg 34'. Second leg 34 extends downwardly beginning at fifth bend 34e. Second leg 34' includes a sixth bend 34f, a seventh bend at 34g, and in the arrangement of FIG. 1, a final bend at 34h where leg 34' meets with leg 34 in a one piece construction near shaft 20. In the arrangement of FIGS. 2 and 2A, leg 34' continues parallel with leg 34, and forms with the lower end of shaft 20'. Shaft 20 and 20' along with legs 34, 34' provide increased support for front support fork 16.

While first rod retention element 28 is described as a generally inverted V-shaped apex, it can also be more of a curved shape. However, the illustrated embodiment has been found advantageous to grip the rod handle and prevent rotation of the rod.

Figure 3:
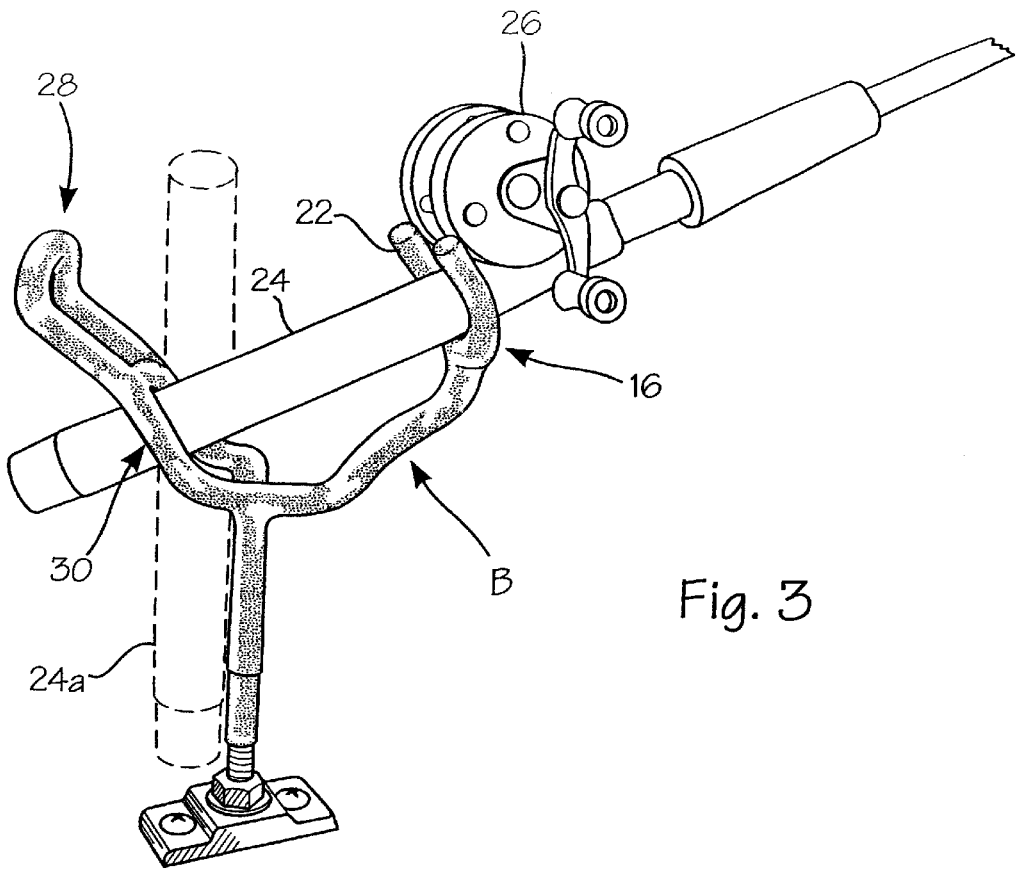
FIG. 3 is a perspective view of a fishing rod holder according to the invention with the fishing rod held in a first fishing position.
Figure 4:
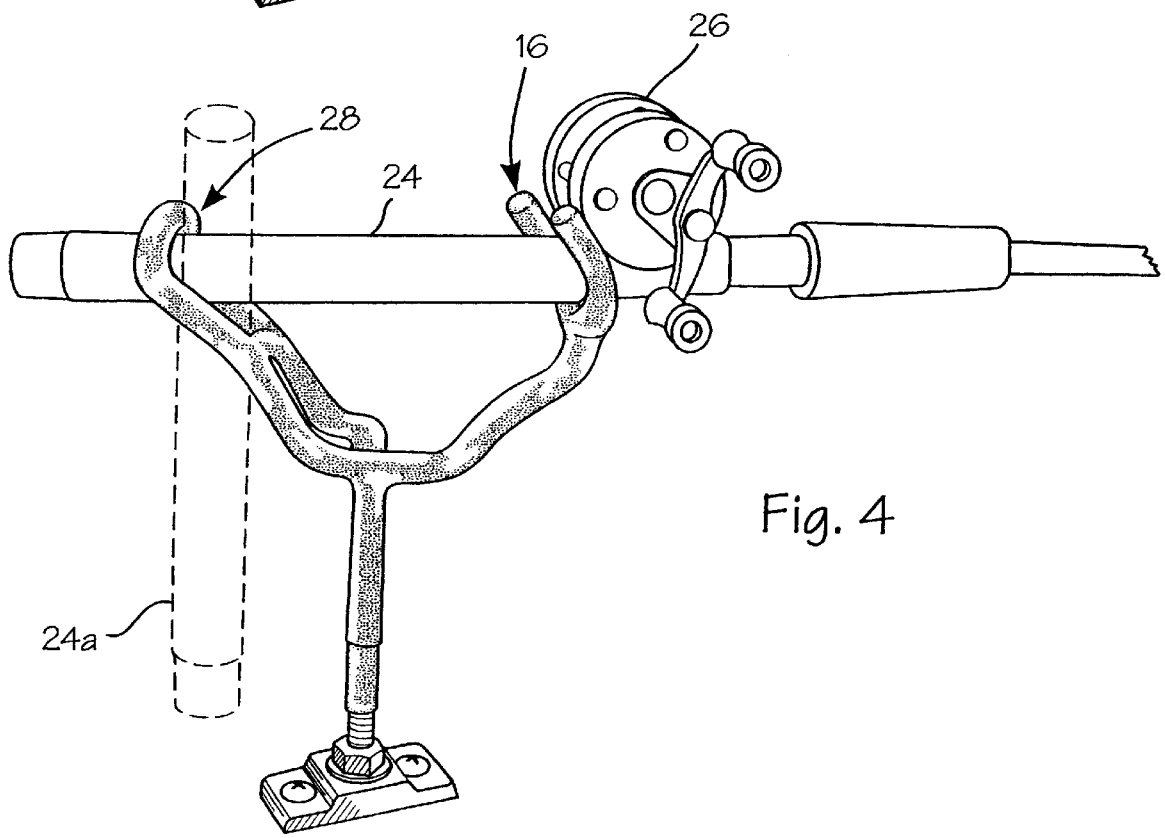
FIG. 4 is a perspective view of a fishing rod holder according to the invention with the fishing rod held in a second fishing position.

Second rod retention element 30, as illustrated in FIGS. 3 and 4, is in the form of a cross-piece in which the handle is gripped. Quite advantageously, it has been found that the provision of a generally flat gripping surface at 16a at the front fork and at the rod retention elements at 28a, 30a results in the expediency of increased rod rotation prevention. This is particularly important for maintaining a bait casting rod and reel in a proper fishing position with the reel facing upward. Advantageously, rod removal spaces 40,42, 42' are provided below respective of rod retention element 28, 30 which facilitates easy and reliable removal of the fishing rod from either rod retention element and fishing position. The rod removal spaces allow the rod to be rotated to a vertical or near vertical position 24a and lifted straight outwardly from the holder. In the case of rod retention space 42', there is provided additional space due to leg 34' continuing forward and merging with shaft 20'. Space 42' extends from second retention element 30 to front fork 16 providing substantially twice the space as provided at removal space 42.

While retention element 30 is shown as a continuous member, it may be in the form of discontinuous abutments which protrude laterally from inner sides of legs 34 into the interior space. It is also noted that the dimensions of the rod cradle are critical and that flattened surfaces 28a, 30a of retention elements 28, 30 enhances the space for the rod handle to be maneuvered and removed from the rod from the cradle. It is also noted that the dimensional relationships illustrated between the front support fork 16 and the rear retention elements 28, 30 is important to ensure that the rod and reel are held in place in a stable and secure manner, but allow for the rod to be quickly removed and the reel operated. By locating support stem 10 on leg 34 forward of first bend 34a also provides more room in rod removal space 42 and particularly rod removal space 42' facilitating easier rod removal.

In a first fishing position illustrated in FIG. 3, the rod is supported in the cradle defined by support fork 16 and second retention element 30. In this position, the rod is elevated, preferably at an angle of about 30 degrees, which is desirable for trolling and for holding a rod whose line has been cast at a distance from the boat. The fishing position shown in FIG. 3 is also desirable when fishing in rough water to maintain the rod at an elevated position as the boat rocks. In the first fishing position, it is noted that the fishing rod is positioned in its most secure placement with fishing reel 26 abutting the inclined second pair of arms 22. This abutment provides the maximum resistance against rotation of the rod so that the reel is maintained in its upright position for operation when the rod is removed. While the rod may be held with the reel spaced a distance from front support fork 16, and still be held in a stable manner, the position illustrated in FIG. 3 provides the most stable position. Rod holder A' provides identical positioning of the rod.

FIG. 4 illustrates a second fishing position in which the fishing rod is held in a cradle defined by front support fork 16 and lower first rod retention 28. In this position, the rod is held in a more or less horizontal position which is used for still fishing with the fishing line depending beside the boat or other fixed structure. It can again be seen that reel 26 is nestled close to front fork 16 so that the circumference of the reel engages the second arm 22 to prevent rotation. Again, rod holder A' provides identical positioning of the rod.

Figure 5:
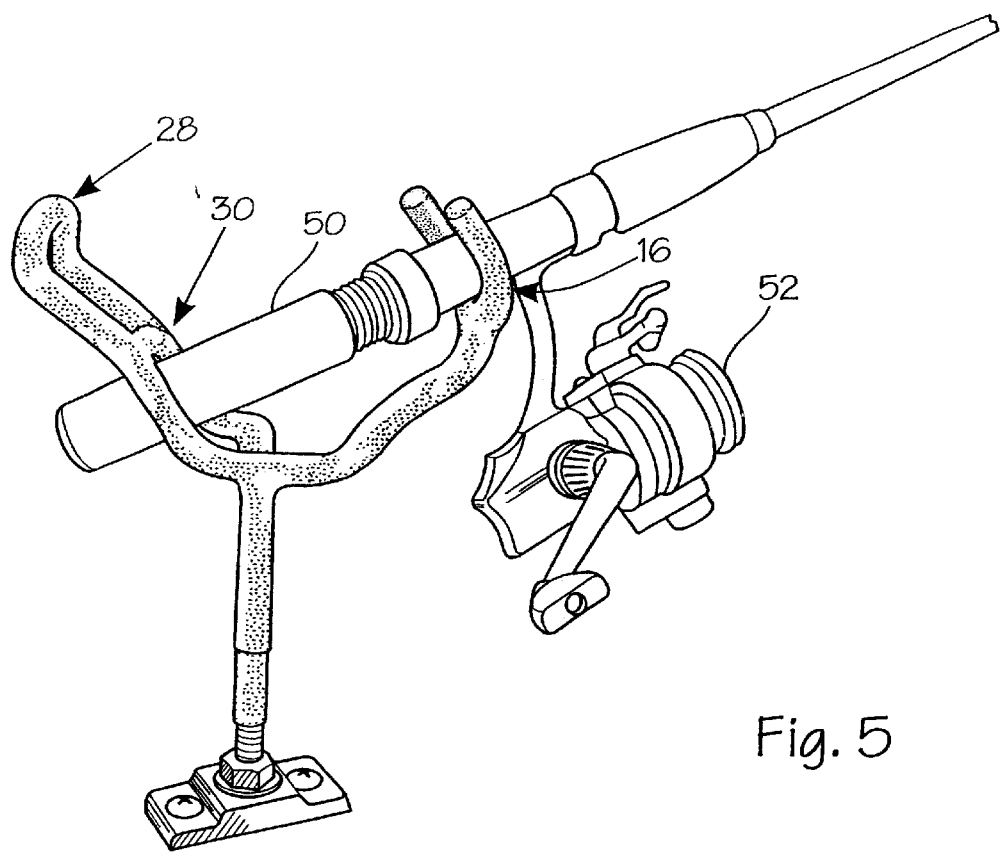
FIG. 5 is a perspective view of a fishing rod holder according to the invention with a spinning rod and reel held in a first fishing position.
Figure 6:
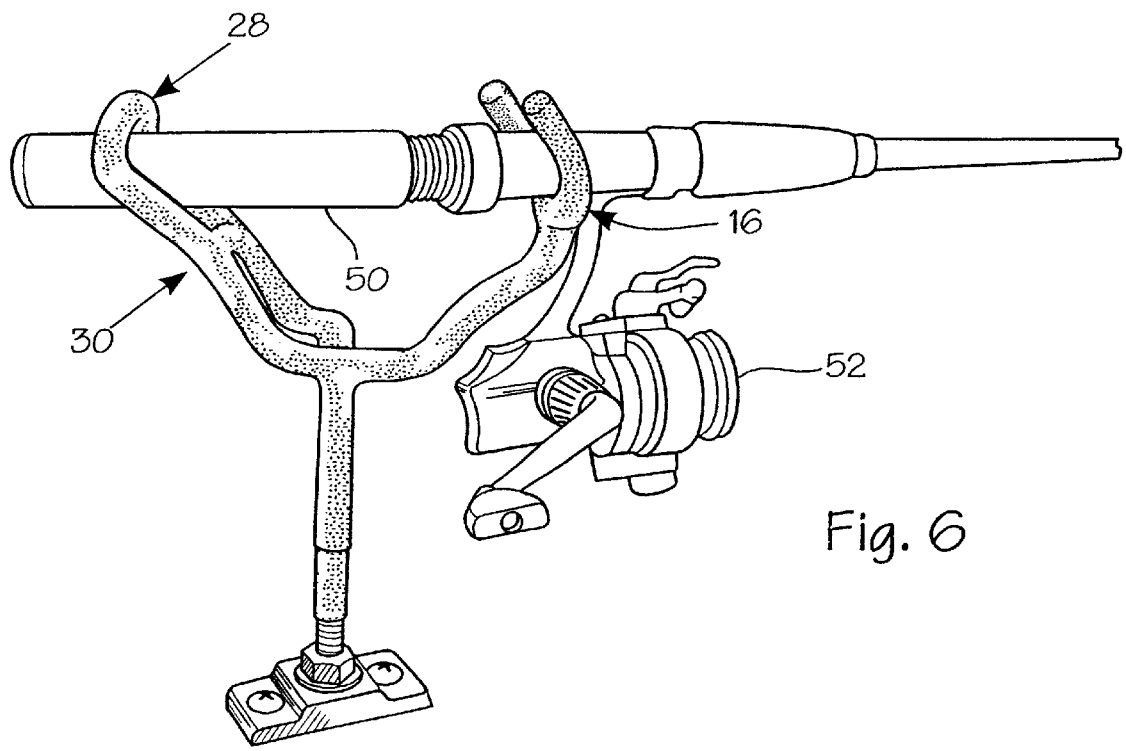
FIG. 6 is a perspective view of a fishing rod holder according to the invention with a spinning rod and reel held in a second fishing position.

FIGS. 5 and 6 show the first and second fishing positions with an open face spinning rod 50 and reel combination wherein the open face reel 52 is hung downwardly during fishing. Thus, the reel is in its normal operating position when held by the rod cradle. Rod holder A' functions in an identical manner.

While preferred embodiments of the invention has been described using specific terms, such description is for illustrative purposes only, and it is to be understood that changes and variations may be made without departing from the spirit or scope of the following claims.

What is claimed is:

1. A fishing rod holder for supporting a fishing rod in a plurality of fishing positions comprising:

a generally U-shaped front support fork having first and second upwardly directed arms forming a rod cradle;

a first and a second shaft extending downwardly and rearwardly from said first and second arms respectively, said first shaft merging with a first leg and said second shaft merging with a second leg;

each of said first and second legs having in sequence, a rearwardly extending extension, a first bend at which said first and second legs turn upward, a second bend at which said first and second legs turn rearward, and a third bend at which said first and second legs turn inward, forming a laterally extending extension;

said laterally extending extensions merging to form a first rod retention member;

a second rod retention member located below and forwardly of said first rod retention member, said second rod retention member being connected to and extending between said first and second legs, whereby, a fishing rod may be supported by said rod holder in a first substantially horizontal position in which said fishing rod is supported on a first side by said first rod retention member and on a second side by said front support fork and in a second elevated position in which said fishing rod is supported on said first side by said second rod retention member and on said second side by said front support fork.

2. The rod holder of claim 1 wherein said rod holder is of fixed shape.

3. The rod holder of claim 1 including a first rod release space between said first and second rod retention members and a second rod release space between said second rod retention member and said front support fork.

4. The rod holder of claim 3 wherein said second rod release space has a length which is at least twice the length of said first rod release space.

5. A one piece integral fishing rod holder for supporting a fishing rod in a plurality of fishing positions comprising:

a support for attachment to an associated structure;

a front support fork carried by said support having a pair of arms separated by a retention area and bent along a first section at a first angle, and bent at a second angle along a second section rearwardly of said first section, said front support fork acting to receive the fishing rod therebetween;

first and second legs carried by said rod holder;

a first rod retention element carried by said first and second legs and spaced from the front support fork for engaging with a handle portion of the fishing rod and positioning and retaining the fishing rod in combination with said support fork in a generally horizontal fishing portion with the fishing line depending from the rod tip; and, a second rod retention element carried by said first and second legs spaced from said front fork and also forward and below said first rod retention element for engaging with the handle portion of the fishing rod and positioning and retaining the fishing rod in combination with said support fork in an inclined fishing position wherein the tip of the rod is elevated from said horizontal fishing position; wherein, said first and second legs each have a first bend at which said first and second legs turn upward, a second bend at which said first and second legs turn rearward, and a third bend at which said first and second legs turn inward; and said first rod retention element being formed inwardly of said third bend; and said second rod retention element being located near said second bend.

6. The holder of claim 5 wherein said retention area includes a generally flat upper surface for supporting the fishing rod.

7. The holder of claim 5 wherein at least a forward facing surface of each of said support fork arms are coated with a high friction coefficient surface for engaging with a reel carried by the fishing rod to prevent rotation of the rod in said fishing positions.

8. The holder of claim 5 including a first rod release space defined between said first rod retention element and said second rod retention element for reliable removal of said fishing rod when desired.

9. The holder of claim 5 including a second rod release space defined between said second rod retention element and said front fork for reliable removal of said fishing rod when desired.

10. The holder of claim 5 wherein said first and second rod retention elements include a flattened handle abutment surface for frictionally engaging said rod handle to resist rod rotation.

11. The holder of claim 5 wherein said rod holder includes:

a cross-piece carried by said support with said first and second legs extending rearwardly and upwardly from said cross-piece, said second leg being spaced laterally from said first leg.

12. The holder of claim 5 wherein said second rod retention element includes an extension extending between said first and second legs near said second bend.

13. A unitary fishing rod holder for supporting a fishing rod in a plurality of fishing positions, said fishing rod holder in combination with said fishing rod comprising:

support;

a front support fork carried by said support for receiving and engaging the fishing rod on a first side at a location spaced from an end of said fishing rod;

a first rod retention element carried by said support in a fixed position transverse said fishing rod for engaging the rod on a second side opposite said first side and at a location spaced from said end to positively support the fishing rod in a generally horizontal fishing position in which the fishing line depends in a position substantially normal of the tip;

a second rod retention element carried by said support in a fixed position transverse said fishing rod and a distance forward of and a distance below said first rod retention element, said second rod retention element engaging the fishing rod on said second side and at a location spaced from said end to positively support the fishing rod in an elevated inclined fishing position in which the fishing line depends in a position forming an acute angle with the fishing rod; wherein, when the fishing rod is supported in a horizontal fishing position by the front support fork and the first rod retention element, the rod is engaged on a first side by the front support fork and is engaged on a second side opposite said first side by the first rod retention element, and when the fishing rod is supported in an elevated inclined fishing position by the front support fork and the second rod retention element, the rod is engaged on a first side by the front support fork and is engaged on said second side at a location spaced from said end by the second rod retention element.

14. The combination of claim 13 wherein at least a forward facing surface of said front support fork is coated with a high friction coefficient surface for gripping the reel carried by the fishing rod to assist in preventing rotation of the rod.

* * * * *